Sept. 7, 1954   R. B. REED ET AL   2,688,574
METHOD OF MAKING BIMETAL CONTACT TAPE
Filed Dec. 6, 1951
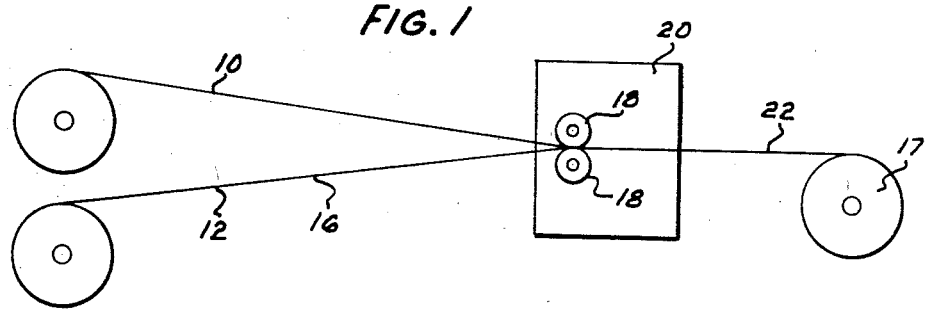
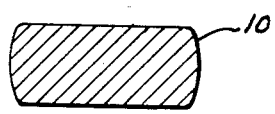
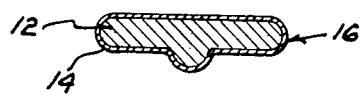
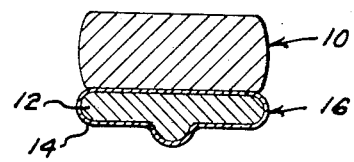
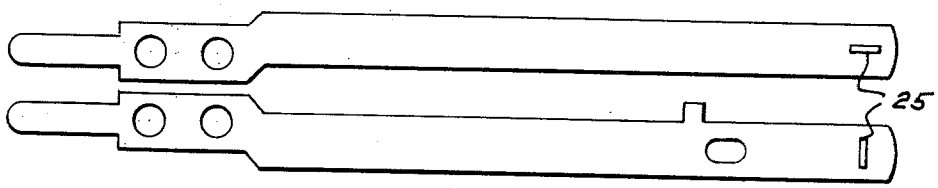
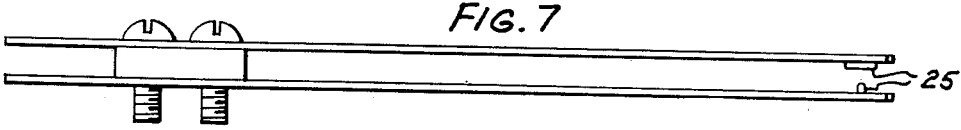
INVENTORS
R. B. REED
E. M. WOODS
BY
ATTORNEY Patented Sept. 7, 1954

2,688,574

UNITED STATES PATENT OFFICE 2,688,574

METHOD OF MAKING BIMETAL CONTACT TAPE

Robert B. Reed, Westchester, and Everett M. Woods, Chicago, Ill., assignors to Western Electric Company, Incorporated, New York, N. Y., a corporation of New York Application December 6, 1951, Serial No. 260,128

9 Claims. (Cl. 148—13)

1

This invention relates to a method of making bi-metal contact tape and more particularly to a method of resistance welding a silver tape to a nickel silver tape.

One type of electrical contact points used for electrical devices is made from bi-metallic tape comprising a ribbon of silver superposed on and bonded to a ribbon of nickel silver. The nickel silver base of the contact may be readily bonded to the contact supporting members or springs as by welding, but difficulty has been experienced in welding silver to nickel silver and effecting a strong bond between the silver cap and the nickel silver base of the contact. In the past, silver on nickel silver contact tape has been made by a process in which a sheet of silver was brazed to a sheet of nickel silver and the composite sheet rolled to a predetermined thickness, after which the composite sheet was slit into relatively narrow tapes from which the contacts were cut and welded to contact springs. In this method of brazing a sheet of silver to a sheet of nickel silver, it is practically impossible to effect the bonding of the two sheets over the entire area thereof so that when the composite sheet is cut into narrow tapes, it has been found that portions of the silver strip are not bonded to the nickel silver strip and readily separate therefrom, thus rendering the tapes unsuitable for use in forming contacts.

It is an object of the present invention to provide an improved method of bonding a strip of silver to a strip of nickel silver.

In one embodiment of the invention for bonding a silver tape to a nickel silver tape, a silver wire and a nickel silver wire are rolled individually into ribbons of predetermined cross-sectional configuration, the nickel silver ribbon has a coating of tin applied thereto after which the two tapes are pulled in superposed relation to each other between a pair of roller electrodes of an electrical welding apparatus and are progressively welded together along successive portions thereof to form a continuous bonded juncture between the tapes. To increase the strength of the bond between the silver and nickel silver ribbons the composite tape may be annealed at a temperature of approximately 1260° F. for approximately 15 minutes.

Other objects and advantages of the invention will become apparent by reference to the following detailed description thereof and the accompanying drawings illustrating a preferred embodiment of the invention in which Fig. 1 is a diagrammatic view of the apparatus for welding together the silver and the nickel silver tapes;

Fig. 2 is a cross-sectional view of the silver tape;

Fig. 3 is a cross sectional view of the nickel silver tape before being tin plated;

Fig. 4 is a cross-sectional view of the nickel silver tape with a coating of tin applied thereto;

Fig. 5 is a cross-sectional view of the composite strip after the silver tape and the tin plated nickel silver tape have been welded together;

Fig. 6 is a plan view of two contact springs provided with contacts manufactured according to the method disclosed herein; and Fig. 7 is a side view of the contact springs shown in Fig. 6 assembled into a unit.

In practicing the present method of making a contact metal tape having a silver cap on a nickel silver base, a silver wire 10 is passed through forming rolls or dies (not shown) which form it into a ribbon of substantially rectangular configuration having a pair of oppositely disposed parallel flat surfaces as shown in Fig. 2, and a wire 12 of nickel silver is passed through forming rolls which shape it into a relatively flat ribbon as shown in Fig. 3 having a pair of oppositely disposed substantially parallel flat surfaces, the lower one of which is provided with a slight rib extending longitudinally in the center thereof, and the upper face of which conforms to and is adapted to be welded to the lower face of the ribbon 10. The nickel silver tape 12 is plated with a relatively thin coating of tin 14 to form a composite tape 16. The plating of tin 14 is relatively thin and preferably is applied to the ribbon 12 electrolytically. The silver tape 10 after being formed, and the nickel silver tape 12 after being coated, may be wound on supply reels prior to further processing.

The ribbon 10 of silver and the tin coated ribbon of nickel silver 16 are advanced in superposed relation to each other by any suitable drive means, e. g. a take-up reel 17, through a pair of roller electrodes 18 of a welding apparatus 20. The rollers 18 have surfaces conforming to the outer surfaces of the tapes and are urged toward each other with a predetermined pressure to press the ribbons 10 and 16 into tight engagement with each other as they are drawn therethrough. A welding current is continuously passed through the rollers and through the tapes as the tapes are pulled through the rollers to effect the resistance welding of the tapes 10 and 16 to each other along successive portions of the tape to form a continuous bonded juncture between the tapes.

Since tin and silver, and tin and nickel silver have a mutual solubility, the plating of tin between the silver tape and the nickel silver tape readily alloys with each tape and serves to effect a relatively strong bond between the silver and the nickel silver tapes.

The silver tape 10 and the tin-ashed nickel silver tape 16 of the composite welded strip 22 were found by various tests, including bending and straightening the strip 22, to be bonded together to a degree which rendered the composite strip highly satisfactory for use as stock from which contact points may be made. It was found, however, that by annealing the composite strip 22 at a temperature of approximately 1260° F. for approximately 15 minutes the strength of the bond between the silver and the nickel silver strip was increased. Photomicrographs of the welded juncture of the silver and the nickel silver strips taken before annealing and after annealing showed that the area of fushion between the tin and silver, and the tin and nickel silver was substantially increased as a result of the annealing and served to strengthen the bond between the silver and the nickel silver strips.

In Figs. 6 and 7 is shown a pair of cooperating springs to which are welded a pair of contacts 25 cut from the composite strip 22.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of making silver on nickel silver contact stock which comprises plating a nickel silver strand with tin, advancing a strand of silver and said plated strand of nickel silver in superposed relation to each other, and simultaneously applying pressure to and passing a welding current through successive portions of said strands to bond said strands together.

2. A method of making silver on nickel silver contact stock which comprises plating a nickel silver strand with tin, advancing a strand of silver and said plated strand of nickel silver in superposed relation to each other, simultaneously applying pressure to and passing a welding current through successive portions of said strands to bond said strands together to form a composite strip, and heating said welded composite strip at a temperature of approximately 1260° F. for a period of approximately 15 minutes.

3. A method of bonding a silver strand to a nickel silver strand which comprises applying a thin coating of tin to one of said strands, advancing said strands in superposed relation to each other, and simultaneously applying pressure to and passing a welding current through successive portions of said strands to bond said strands together.

4. A method of bonding a silver strand to a nickel silver strand which comprises applying a thin coating of tin to one of said strands, advancing said strands in superposed relation to each other, simultaneously applying pressure to and passing a welding current through successive portions of said strands to bond said strands together to form a composite welded strip, and heating said welded composite strip at a temperature of approximately 1260° F. for a period of approximately 15 minutes.

5. A method of bonding a silver tape to a nickel silver tape which comprises forming ribbons of silver metal and of nickel silver metal with conforming surfaces adapted to engage each other, plating one of said ribbons with a coating of tin, pressing said ribbons together progressively along successive portions thereof with the conforming surfaces in engagement with each other, and passing a welding current progressively through successive portions of said ribbons as they are pressed together.

6. A method of bonding a silver tape to a nickel silver tape which comprises forming ribbons of silver metal and of nickel silver metal with conforming surfaces adapted to engage each other, plating one of said ribbons with a coating of tin, pressing said ribbons together progressively along successive portions thereof with the conforming surfaces in engagement with each other, passing a welding current progressively through successive portions of said ribbons as they are pressed together to form a composite strip, and heating said composite strip at a temperature of approximately 1260° F. for a period of approximately 15 minutes.

7. A method of making silver on nickel silver contact stock which comprises forming wires of silver and of nickel silver into ribbons with conforming surfaces adapted to engage each other, plating the ribbon of nickel silver with tin, pressing said ribbons together progressively along successive portions thereof with the conforming surfaces in engagement with each other, and passing a welding current progressively through successive portions of said ribbons as they are pressed together to bond the ribbons together.

8. A method of making silver on nickel silver contact stock which comprises forming wires of silver and of nickel silver into ribbons with conforming surfaces adapted to engage each other, plating the ribbon of nickel silver with tin, pressing said ribbons together progressively along successive portions thereof with the conforming surfaces in engagement with each other, passing a welding current progressively through successive portions of said ribbons as they are pressed together to bond the ribbons together, and heating said welded composite strip at a temperature of approximately 1260° F. for a period of approximately 15 minutes.

9. A method of bonding a silver strand to a nickel silver strand which comprises applying a thin coating of tin to at least one surface of one of said strands, advancing said strands, advancing said strands in superposed relation to each other with the tin coated surface of said one strand in abutting relation with the other strand, and simultaneously applying pressure to and passing a welding current through successive portions of said strands to bond said strands together.

References Cited in the file of this patent

UNITED STATES PATENTS

| Number | Name | Date |
| --- | --- | --- |
| 1,636,656 | Capicotto | July 19, 1927 |
| 1,828,977 | Miller | Oct. 27, 1931 |
| 2,414,463 | Gunn et al. | Jan. 21, 1947 |
| 2,481,087 | Crise | Sept. 6, 1949 |
| 2,558,093 | Kinney, Jr. | June 26, 1951 |